United States Patent
Li et al.

(10) Patent No.: US 10,151,373 B1
(45) Date of Patent: Dec. 11, 2018

(54) PLANETARY DAMPER ARCHITECTURE WITH CENTRIFUGAL PENDULUM ABSORBER

(71) Applicant: GM GLOBAL TECHNOLOGY OPERATIONS LLC, Detroit, MI (US)

(72) Inventors: Dongxu Li, Troy, MI (US); Farzad Samie, Franklin, MI (US); Derek F. Lahr, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/618,533

(22) Filed: Jun. 9, 2017

(51) Int. Cl.
    *F16F 15/131* (2006.01)
    *F16F 15/14* (2006.01)
    *F16H 45/02* (2006.01)

(52) U.S. Cl.
    CPC .... *F16F 15/13157* (2013.01); *F16F 15/1478* (2013.01); *F16H 45/02* (2013.01); *F16H 2045/0226* (2013.01); *F16H 2045/0263* (2013.01); *F16H 2045/0268* (2013.01)

(58) Field of Classification Search
    None
    See application file for complete search history.

(56) References Cited

U.S. PATENT DOCUMENTS

| | | | |
|---|---|---|---|
| 9,765,839 B2 * | 9/2017 | Lorenz | F16F 7/116 |
| 9,765,849 B2 * | 9/2017 | Dieckhoff | F16F 15/13157 |
| 2013/0068580 A1 * | 3/2013 | Doegel | F16F 15/1478 192/3.28 |
| 2015/0192190 A1 * | 7/2015 | Lorenz | F16F 15/13157 464/7 |
| 2016/0160957 A1 * | 6/2016 | Dieckhoff | F16F 15/1206 192/3.28 |

\* cited by examiner

*Primary Examiner* — Jacob S. Scott
(74) *Attorney, Agent, or Firm* — Quinn IP Law

(57) ABSTRACT

A powertrain includes an engine having a crankshaft, and a transmission having an input. A vibration absorption assembly includes a mechanical connection system providing a first connection node, a second connection node, and a third connection node. The crankshaft is connected to a first one of the connection nodes. The input of the transmission is connected to a second one of the connection nodes. A centrifugal pendulum absorber is connected to a third one of the connection nodes. One of the connection nodes is a mechanically advantaged node. The centrifugal pendulum absorber is connected to the mechanically advantaged node.

13 Claims, 7 Drawing Sheets

PLANETARY DAMPER ARCHITECTURE WITH CENTRIFUGAL PENDULUM ABSORBER

INTRODUCTION

The disclosure generally relates to a powertrain for a vehicle.

Vehicle powertrains may include a vibration absorption assembly for reducing an amplitude of torsional vibration. The vibration absorption assembly may include, for example, damper springs that absorb the torsional vibration and release the torsional vibration at a later time. In addition to the damper springs, or as an alternative to the damper springs, the vibration adsorption assembly may include some other device, such as a centrifugal pendulum absorber. The centrifugal pendulum absorber includes a drive plate and a mass that swings back and forth. The torsional vibration cancelling effect provided by the centrifugal pendulum absorber is dependent upon how much torque the mass generates against the drive plate as the mass swings.

SUMMARY

A powertrain is provided. The powertrain includes an engine having a crankshaft, and a transmission having an input. A vibration absorption assembly includes a mechanical connection system. The mechanical connection system provides a first connection node, a second connection node, and a third connection node. The crankshaft of the engine is coupled to a first one of the first connection node, the second connection node, and the third connection node. The input of the transmission is connected to a second one of the first connection node, the second connection node, and the third connection node. A centrifugal pendulum absorber is connected to one of the first connection node, the second connection node, and the third connection node.

In one aspect of the powertrain described herein, one of the first connection node, the second connection node and the third connection node is a mechanically advantaged node. The centrifugal pendulum absorber is connected to the mechanically advantaged node.

In another aspect, the powertrain includes a torque converter having a pump and a turbine. The pump is connected to the crankshaft for continuous rotation with the crankshaft. The turbine is connected to the third one of the first connection node, the second connection node, and the third connection node, which is connected to the centrifugal pendulum absorber. Furthermore, the turbine is connected to the mechanically advantaged node, just as the centrifugal pendulum absorber is.

In another aspect of the powertrain, the first connection node, the second connection node, and the third connection node are each different nodes of the mechanical connection system. The centrifugal pendulum absorber is not connected to the first one of the first connection node, the second connection node, and the third connection node to which the output of the torque converter clutch is connected. Similarly, the centrifugal pendulum absorber is not connected to the second one of the first connection node, the second connection node and the third connection node to which the input of the transmission is connected.

In another aspect of the powertrain, the powertrain includes a spring that interconnects two of the first connection node, the second connection node, and the third connection node.

In one embodiment, the powertrain includes a torque converter clutch having an input and an output. The input of the torque converter clutch is connected to the crankshaft. The output of the torque converter clutch is connected to the first one of the connection nodes. The torque converter clutch interconnects the crankshaft and the first one of the connection nodes. The torque converter clutch is selectively controlled between an engaged state connecting the crankshaft and the mechanical connection system in direct torque communication, and a disengaged state disconnecting direct torque communication between the crankshaft and the mechanical connection system.

In one embodiment of the powertrain, the mechanical connection system includes a planetary gear set having a ring gear, a sun gear, and a planet carrier supporting a planet gear. Each of the ring gear, the sun gear, and the planet carrier define a respective one of the first connection node, the second connection node, and the third connection node.

Accordingly, the centrifugal pendulum absorber is connected to the mechanically advantaged node of the mechanical connection system. As such, the mechanically advantaged node amplifies the torsional vibration cancelling effect provided by the centrifugal pendulum absorber. Therefore, a mass of the centrifugal pendulum absorber may be reduced, while maintaining the same torsional vibration cancelling effect, because the torsional vibration cancelling effect from the reduced mass is amplified by the mechanically advantaged node of the mechanical connection system.

The above features and advantages and other features and advantages of the present teachings are readily apparent from the following detailed description of the best modes for carrying out the teachings when taken in connection with the accompanying drawings.

DETAILED DESCRIPTION

Figure 1:
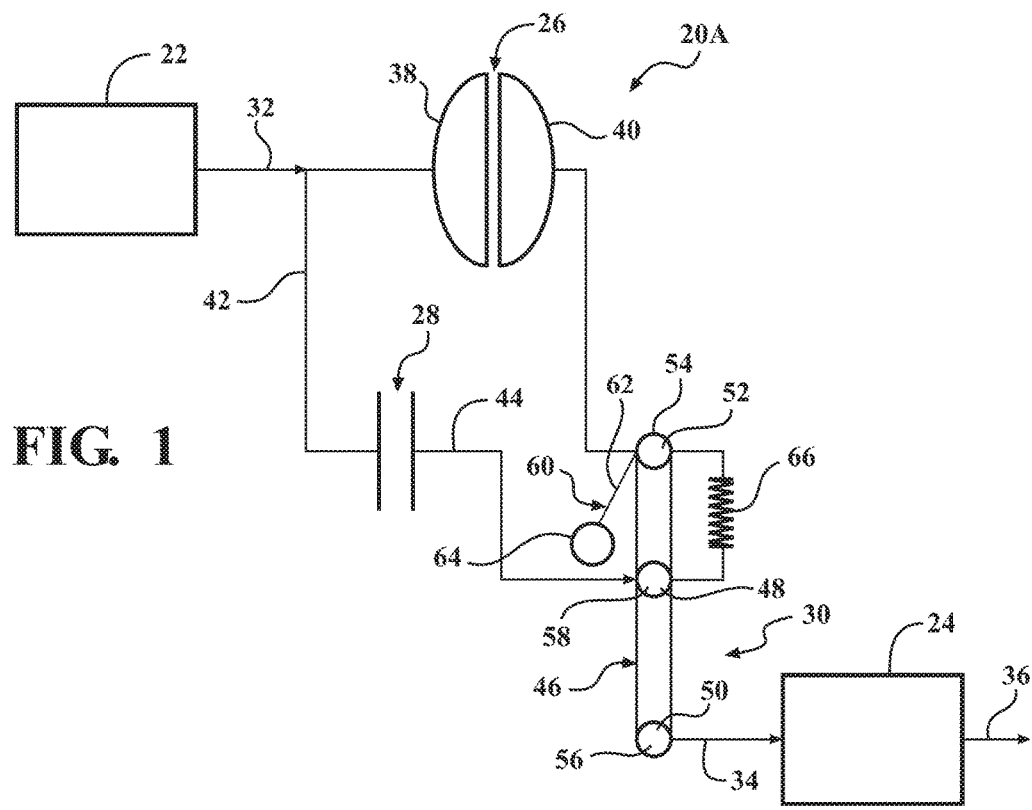
FIG. 1 is a schematic diagram of a first embodiment of the powertrain.

Those having ordinary skill in the art will recognize that terms such as "above," "below," "upward," "downward,"

"top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the FIGS., wherein like numerals indicate like parts throughout the several views, an exemplary embodiment of a powertrain is generally shown at 20A-20L. Different connection combinations of the powertrain 20A-20L are shown in FIGS. 1-12, and are specifically referred to in each figure by the reference numerals 20A-20L respectively. FIGS. 1-12 represent different possible connection combinations of the exemplary embodiment of the powertrain 20A-20L, It should be appreciated that other embodiments of the powertrain are possible within the scope of the disclosure, and that other embodiments of the powertrain will each include their own respective possible component combinations and/or configurations. The description of the powertrain 20A-20L is applicable to all embodiments, unless otherwise noted. Referring to FIGS. 1-12, the exemplary embodiment of the powertrain 20A-20L includes an engine 22, a transmission 24, a torque converter 26, a torque converter clutch 28, and a vibration absorption assembly 30. It should be appreciated that other embodiments of the powertrain not shown or described herein may include other components and/or have the components arranged in different configurations.

The engine 22 includes a crankshaft 32, and is operable to generate torque and rotate the crankshaft 32 about a central axis. The engine 22 may include any device that is capable of generating torque and rotating the crankshaft 32. For example, the engine 22 may include, but is not limited to, an internal combustion engine 22 such as a gasoline engine 22, a diesel engine 22, etc. It should be appreciated that the engine 22 is not limited to an internal combustion engine 22, and may include some other device not specifically described or mentioned herein. The specific type, construction, and operation of the engine 22 are not pertinent to the teachings of this disclosure, and are therefore not described in detail herein.

The transmission 24 may include any type, style, and/or configuration suitable for a moveable platform. For example, the transmission 24 may include, but is not limited to, an automatic transmission, a manual transmission, a dual clutch transmission, a continuously variable transmission, etc. The transmission 24 includes an input 34, an output 36, and a gear set (not shown) interconnecting the input 34 and the output 36. The input 34 is configured to receive torque from the engine 22. The output 36 is configured to supply torque to a final drive system (not shown). The gear set provides different gear ratios through which the torque from the engine 22 may be transferred to change the torque and rotational speed of the output 36 of the transmission 24 relative to the input 34 of the transmission 24. The specific, type, construction, and operation of the transmission 24 are not pertinent to the teachings of this disclosure, and are therefore not described in detail herein.

The torque converter 26 includes a pump 38 and a turbine 40 that cooperate together to form a fluid coupling. The pump 38 is connected to the crankshaft 32 for continuous rotation with the crankshaft 32. The turbine 40 is coupled to the input 34 of the transmission 24. As described herein, the turbine 40 is indirectly coupled to the input 34 via the vibration absorption assembly 30. As is understood by those skilled in the art, a fluid circulating through the torque converter 26 transfers torque between the pump 38 and the turbine 40, thereby connecting the crankshaft 32 and the input 34 of the transmission 24 in torque communication. The specific, type, construction, and operation of the torque converter 26 are not pertinent to the teachings of this disclosure, and are therefore not described in detail herein.

The exemplary embodiment of the powertrain 20A-20L includes the torque converter clutch 28 interconnecting the crankshaft 32 and the vibration absorption assembly 30. However, it should be appreciated that other embodiments of the powertrain may include other components not shown or described herein interconnecting the crankshaft 32 and the vibration absorption assembly 30. Furthermore, some embodiments of the powertrain may include the crankshaft 32 being directly connected to the vibration absorption assembly 30. The torque converter clutch 28 may be referred to as a torque converter lock-up clutch. The torque converter clutch 28 includes an input 42 and an output 44. The input 42 of the torque converter clutch 28 is connected to the crankshaft 32. The output 44 of the torque converter clutch 28 is connected to the input 34 of the transmission 24, via the vibration absorption assembly 30. As is understood by those skilled in the art, the torque converter clutch 28 is selectively controlled between an engaged state and a disengaged state. When disposed in the engaged state, the torque converter clutch 28 connects the crankshaft 32 and the input 34 of the transmission 24, through the vibration absorption assembly 30, in direct torque communication. When disposed in the disengaged state, the torque converter clutch 28 disconnects direct torque communication between the crankshaft 32 and the vibration absorption assembly 30. When the torque converter clutch 28 is disposed in the disengaged state, torque only passes to the input 34 of the transmission 24 through the torque converter 26. However, when the torque converter clutch 28 is disposed in the engaged state, torque may pass to the input 34 of the transmission 24 through either the torque converter 26 and/or the torque converter clutch 28.

The vibration absorption assembly 30 includes a mechanical connection system 46. The mechanical connection system 46 provides a first connection node 48, a second connection node 50, and a third connection node 52. Each of the connection nodes provides a connection to a component of the powertrain 20A-20L. The mechanical connection system 46 may include any mechanical system that provides the three connection nodes, and is able to provide at least one of the connection nodes with a mechanical advantage. As used herein, the term mechanical advantage is defined as force amplification achieved by a mechanical device. In the exemplary embodiment described herein and shown in the Figures, the mechanical connection system 46 is embodied as a planetary gear set. As such, the planetary gear set provides a mechanical advantage to at least one of the connection nodes. However, it should be appreciated that the mechanical connection system 46 may be embodied as some other mechanical system, such as but not limited to a bar linkage system.

As noted above, the embodiment of the mechanical connection system 46 shown in the Figures and described herein is embodied as a planetary gear set. The planetary gear set includes a ring gear 54, a sun gear 56, and a planet carrier 58 supporting at least one planet gear (not shown). Each of the ring gear 54, the sun gear 56, and the planet carrier 58 define a respective one of the first connection node 48, the second connection node 50, and the third connection node 52. In general, the planetary gear set includes the planet gears rotating about and in meshing engagement with the sun gear 56, with the ring gear 54 disposed about and in meshing engagement with the planet gears. A different component may be connected to each node respectively, i.e., each of the ring gear 54, the sun gear 56, and the planet carrier 58. The components and the operation of suitable planetary gear sets, including the ring gear 54, the sun gear 56, and the planet carrier 58 supporting the planet gears, are well known in the art, and are therefore not described in greater detail herein.

Figure 13:
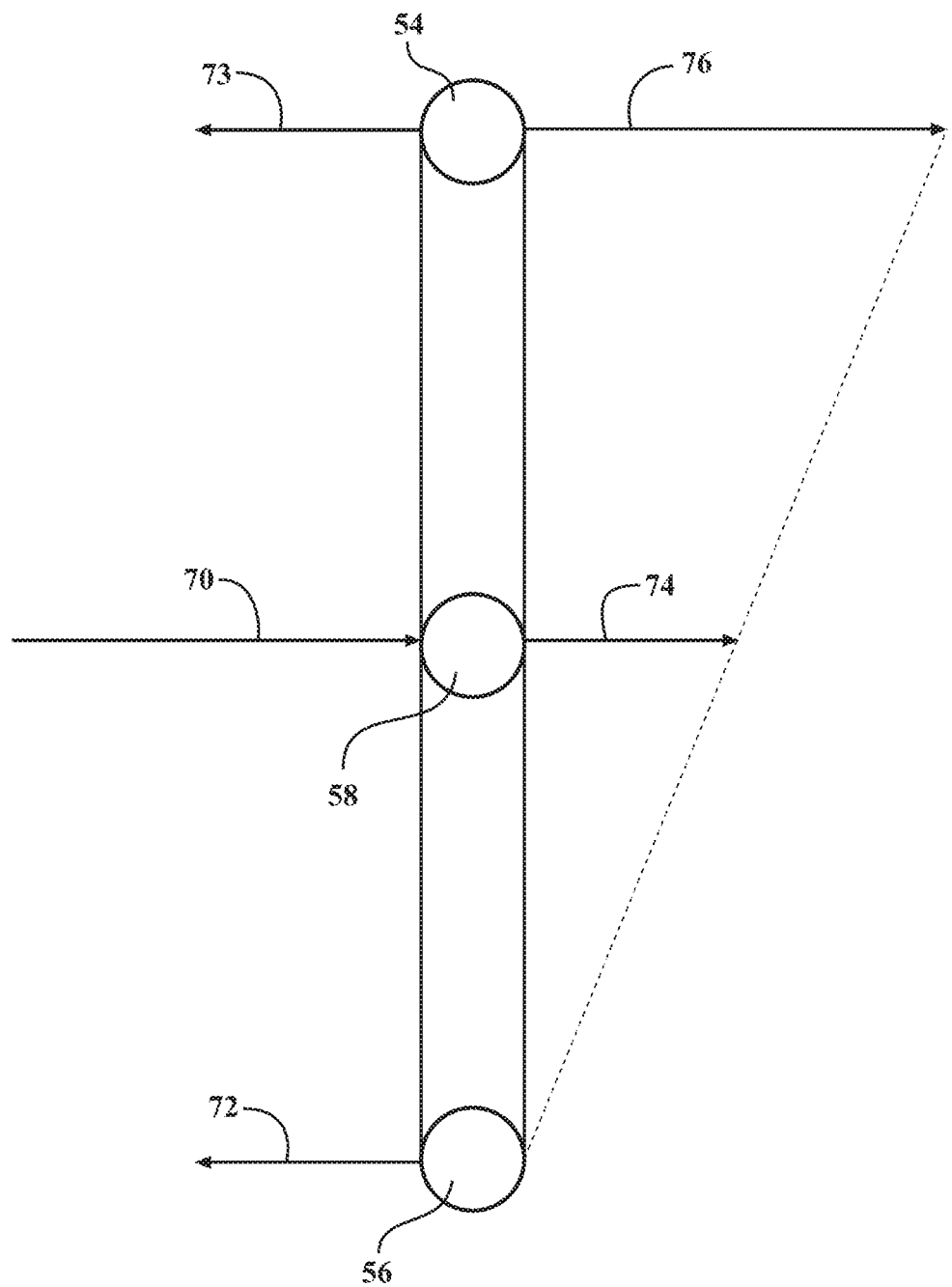
FIG. 13 is a schematic lever diagram of a mechanical connection system of a powertrain.

As noted above, the each component of the planetary gear set, i.e., the ring gear 54, the sun gear 56, and the planet carrier 58, provides a respective one of the first connection node 48, the second connection node 50, and the third connection node 52. Furthermore, as described above, the mechanical connection system 46 provides one of the three connection nodes 48, 50, 52 with a mechanical advantage. Accordingly, one of the first connection node 48, the second connection node 50 and the third connection node 52 is defined as a mechanically advantaged node. As used herein, the term "mechanically advantaged node" is defined as any one of the first connection node 48, the second connection node 50 or the third connection node 52 that has a mechanical advantage over any other one of the first connection node 48, the second connection node 50, or the third connection node 52. It should be appreciated that two of the connection nodes 48, 50, 52 may have a mechanical advantage over the other connection node 48, 50, 52, and that the mechanically advantaged node may be defined as either one of the two connection nodes 48, 50, 52 that have a mechanical advantage over the other connection node 48, 50, 52. For example, as shown in the exemplary lever diagram of FIG. 13, an input torque 70 is applied to the planet carrier 58. The sun gear 56 provides an output torque 72, and the ring gear 54 provides an output torque 73. Since the output torque 72 and the output torque 73 are smaller than the input torque 70, both the sun gear 56 and the ring gear 54 have a mechanical advantage over the planet carrier 58. As such, either one of the sun gear 56 or the ring gear 54 may be defined as the mechanically advantaged node, because either one has a mechanical advantage of the planet carrier 58. FIG. 13 further shows the angular velocity of the planet carrier 58 as the output arrow 74, and the angular velocity of the ring gear 54 as the output arrow 76. It should be appreciated that the respective nodes may differ from the exemplary embodiment shown in FIG. 13.

The crankshaft 32 is connected to one of the connection nodes 48, 50, 52. The crankshaft 32 may be directly connected to one of the connection nodes, or may be indirectly connected to one of the connection nodes through one or more different components. For example, the exemplary embodiment of the powertrain 20A-20L shows the torque converter clutch 28 interconnecting the crankshaft 32 and one of the connection nodes 48, 50, 52. The crankshaft 32 is connected to a first one of the first connection node 48, the second connection node 50, and the third connection node 52. Referring to FIGS. 1-12, in the exemplary embodiment of the powertrain 20A-20L, the output 44 of the torque converter clutch 28 interconnects the crankshaft 32 and the first one of the connection nodes 48, 50, 52. As such, the output 44 of the torque converter clutch 28 is connected to the first one of the first connection node 48, the second connection node 50, or the third connection node 52. The first one of the first connection node 48, the second connection node 50, and the third connection node 52 may include any one of the ring gear 54, the sun gear 56, or the planet carrier 58. The input 34 of the transmission 24 is connected to a second one of the first connection node 48, the second connection node 50, and the third connection node 52. The second one of the first connection node 48, the second connection node 50, and the third connection node 52 may include any one of the ring gear 54, the sun gear 56, or the planet carrier 58.

A centrifugal pendulum absorber 60 is connected to a third one of the first connection node 48, the second connection node 50, and the third connection node 52. The third one of the first connection node 48, the second connection node 50, and the third connection node 52 may include any one of the ring gear 54, the sun gear 56, or the planet carrier 58. The centrifugal pendulum absorber 60 is connected to the mechanically advantaged node. Additionally, in the exemplary embodiment of the powertrain 20A-20L shown and described herein, the turbine 40 of the torque converter 26 is connected to the third one of the first connection node 48, the second connection node 50, and the third connection node 52. Since the third one of the connection nodes is the node that the centrifugal pendulum absorber 60 is connected to, the third one of the connection nodes is also the mechanically advantaged node. As such, the turbine 40 of the torque converter 26 is also connected to the mechanically advantaged node.

The first connection node 48, the second connection node 50, and the third connection node 52 are each different nodes of the mechanical connection system 46. As such, the centrifugal pendulum absorber 60 is not connected to the first one of the first connection node 48, the second connection node 50, or the third connection node 52 to which the crankshaft 32 is connected. Additionally, the centrifugal pendulum absorber 60 is not connected to the second one of the first connection node 48, the second connection node 50 and the third connection node 52 to which the input 34 of the transmission 24 is connected.

As is understood by those skilled in the art, the centrifugal pendulum absorber 60 is a type of tuned mass 64 absorber that reduces the amplitude of torsional vibration in the crankshaft 32. Generally described, the centrifugal pendulum absorber 60 includes a drive plate 62 and a mass 64 suspended from the drive plate 62. The mass 64 has a center of gravity that moves along a prescribed path. When the drive plate 62 is subjected to fluctuating torque, i.e., torsional vibrations, the mass 64 swings back and forth like a pendulum, which counteracts the torsional vibrations. The centrifugal pendulum absorber 60 may be tuned to a given harmonic order of rotation, rather than to a set frequency, and is therefore effective over a continuous range of rotational speeds. The specific, construction, components, and operation of the centrifugal pendulum absorber 60 are well known in the art, and are therefore not described in detail herein.

As noted above, the centrifugal pendulum absorber 60 is connected to the mechanically advantaged node of the mechanical connection system 46. By connecting the centrifugal pendulum absorber 60 to the mechanically advantaged node, the torque provided by the centrifugal pendulum absorber 60 is amplified by the mechanical advantage. Because the torque from the centrifugal pendulum absorber 60 is amplified, the centrifugal pendulum absorber 60 may include a smaller mass 64, while providing the same torsional vibration cancelling effect.

The vibration absorption system may further includes at least one spring 66. In one exemplary embodiment, the vibration absorption system includes a plurality of springs 66. The springs 66 interconnect two of the first connection node 48, the second connection node 50, and the third connection node 52. The springs 66 may connect any two of the connection nodes. The springs 66 dampen the torsional vibration from the crankshaft 32, as is well known in the art. The specific construction and operation of the springs 66 are not pertinent to the teachings of this disclosure and are therefore not described in detail herein.

As described above, crankshaft 32 is connected to the first one of the connection nodes, the input 34 of the transmission 24 is connected to the second one of the connection nodes, and the centrifugal pendulum absorber 60 is connected to the third one of the connection nodes. Additionally, the turbine 40 of the torque converter 26 is also attached to the third one of the connection nodes, and the spring 66 is attached to two of the connection nodes. There exist many possible connection combinations for the exemplary embodiment of the powertrain 20A-20L, with each connection combination for the exemplary embodiment of the powertrain 20A-20L generally shown in one of the respective FIGS. 1-12. It should be appreciated that other embodiments of the powertrain will have other possible combinations, and that the exemplary combinations shown and described herein are not exhaustive, and are merely provided as examples.

Referring to FIG. 1, a first embodiment of the powertrain is generally shown at 20A. The powertrain 20A shows the output 44 from the torque converter clutch 28 connected to the planet carrier 58, the input 34 of the transmission 24 connected to the sun gear 56, the turbine 40 and the centrifugal pendulum absorber 60 connected to the ring gear 54. Accordingly, in this embodiment, the planet carrier 58 may be defined as the first one of the connection nodes, the sun gear 56 may be defined as the second one of the connection nodes, and the ring gear 54 may be defined as the third one of the connection nodes. The spring 66 interconnects the ring gear 54 and the planet carrier 58. The ring gear 54 provides the mechanically advantaged node, whereas the planet carrier 58 and the sun gear 56 provide the non-mechanically advantaged nodes.

Figure 2:
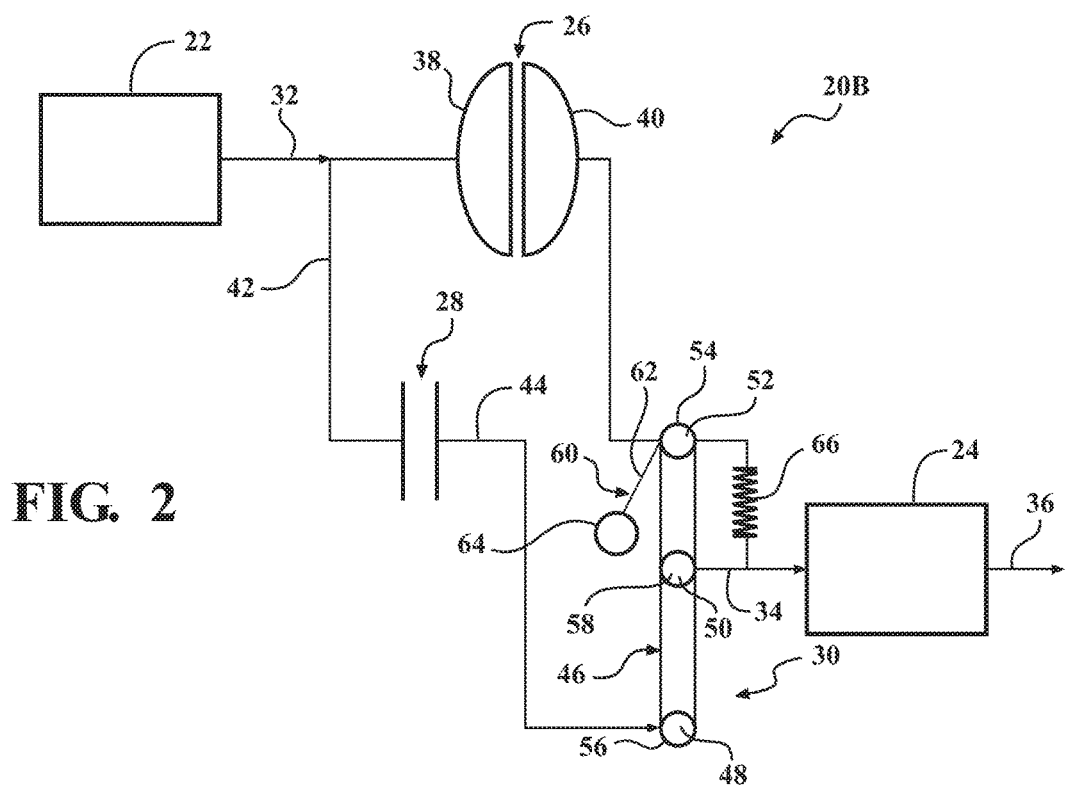
FIG. 2 is a schematic diagram of a second embodiment of the powertrain.

Referring to FIG. 2, a second embodiment of the powertrain is generally shown at 20B. The powertrain 20B shows the output 44 from the torque converter clutch 28 connected to the sun gear 56, the input 34 of the transmission 24 connected to the planet carrier 58, the turbine 40 and the centrifugal pendulum absorber 60 connected to the ring gear 54. Accordingly, in this embodiment, the sun gear 56 may be defined as the first one of the connection nodes, the planet carrier 58 may be defined as the second one of the connection nodes, and the ring gear 54 may be defined as the third one of the connection nodes. The spring 66 interconnects the ring gear 54 and the planet carrier 58. The ring gear 54 provides the mechanically advantaged node, whereas the planet carrier 58 and the sun gear 56 provide the non-mechanically advantaged nodes.

Figure 3:
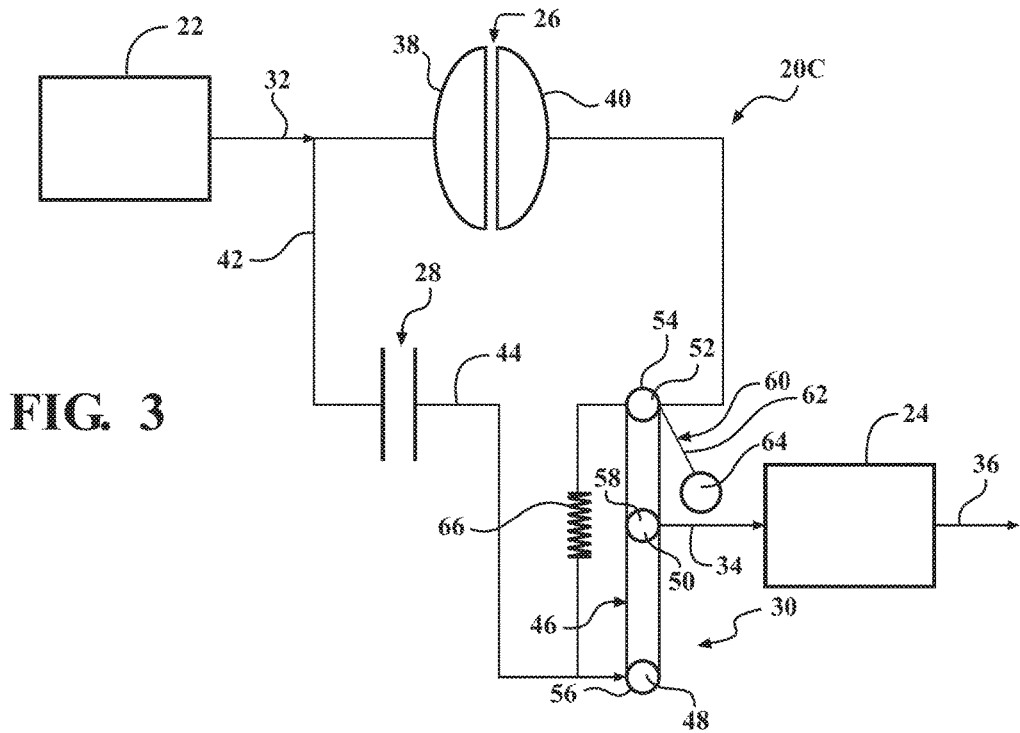
FIG. 3 is a schematic diagram of a third embodiment of the powertrain.

Referring to FIG. 3, a third embodiment of the powertrain is generally shown at 20C. The powertrain 20C shows the output 44 from the torque converter clutch 28 connected to the sun gear 56, the input 34 of the transmission 24 connected to the planet carrier 58, the turbine 40 and the centrifugal pendulum absorber 60 connected to the ring gear 54. Accordingly, in this embodiment, the sun gear 56 may be defined as the first one of the connection nodes, the planet carrier 58 may be defined as the second one of the connection nodes, and the ring gear 54 may be defined as the third one of the connection nodes. The spring 66 interconnects the ring gear 54 and the sun gear 56. The ring gear 54 provides the mechanically advantaged node, whereas the planet carrier 58 and the sun gear 56 provide the non-mechanically advantaged nodes.

Figure 4:
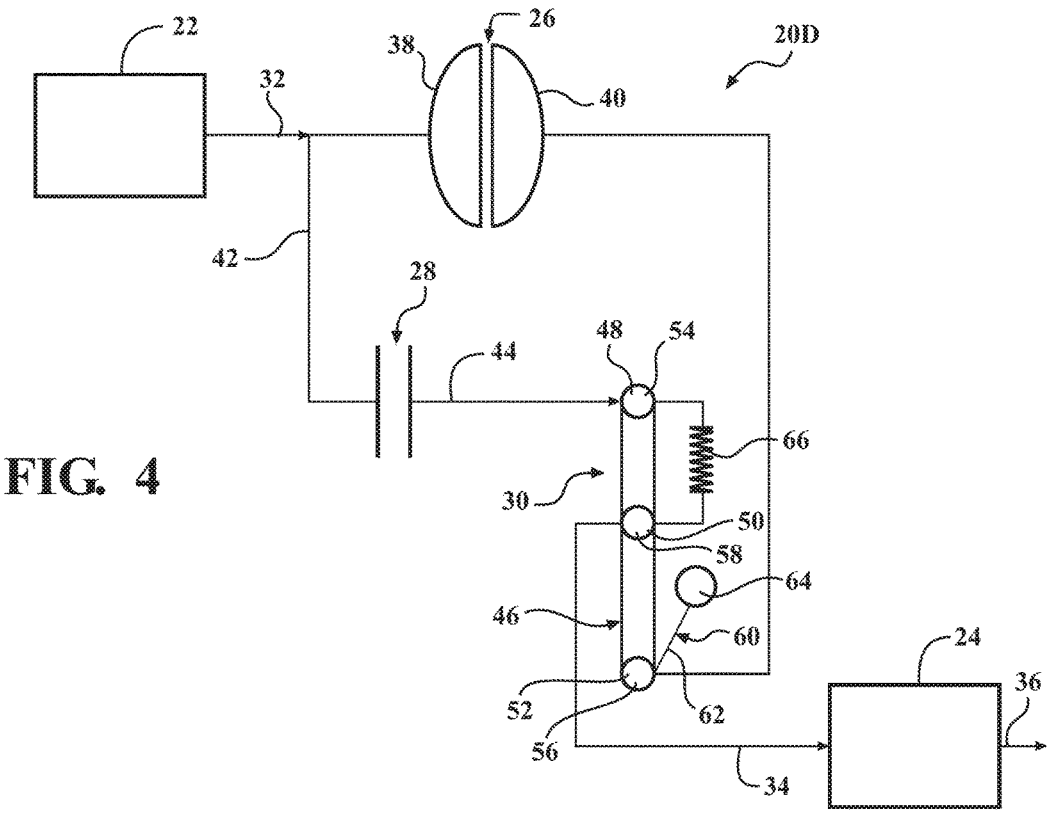
FIG. 4 is a schematic diagram of a fourth embodiment of the powertrain.

Referring to FIG. 4, a fourth embodiment of the powertrain is generally shown at 20D. The powertrain 20D shows the output 44 from the torque converter clutch 28 connected to the ring gear 54, the input 34 of the transmission 24 connected to the planet carrier 58, the turbine 40 and the centrifugal pendulum absorber 60 connected to the sun gear 56. Accordingly, in this embodiment, the ring gear 54 may be defined as the first one of the connection nodes, the planet carrier 58 may be defined as the second one of the connection nodes, and the sun gear 56 may be defined as the third one of the connection nodes. The spring 66 interconnects the ring gear 54 and the planet carrier 58. The sun gear 56 provides the mechanically advantaged node, whereas the planet carrier 58 and the ring gear 54 provide the non-mechanically advantaged nodes.

Figure 5:
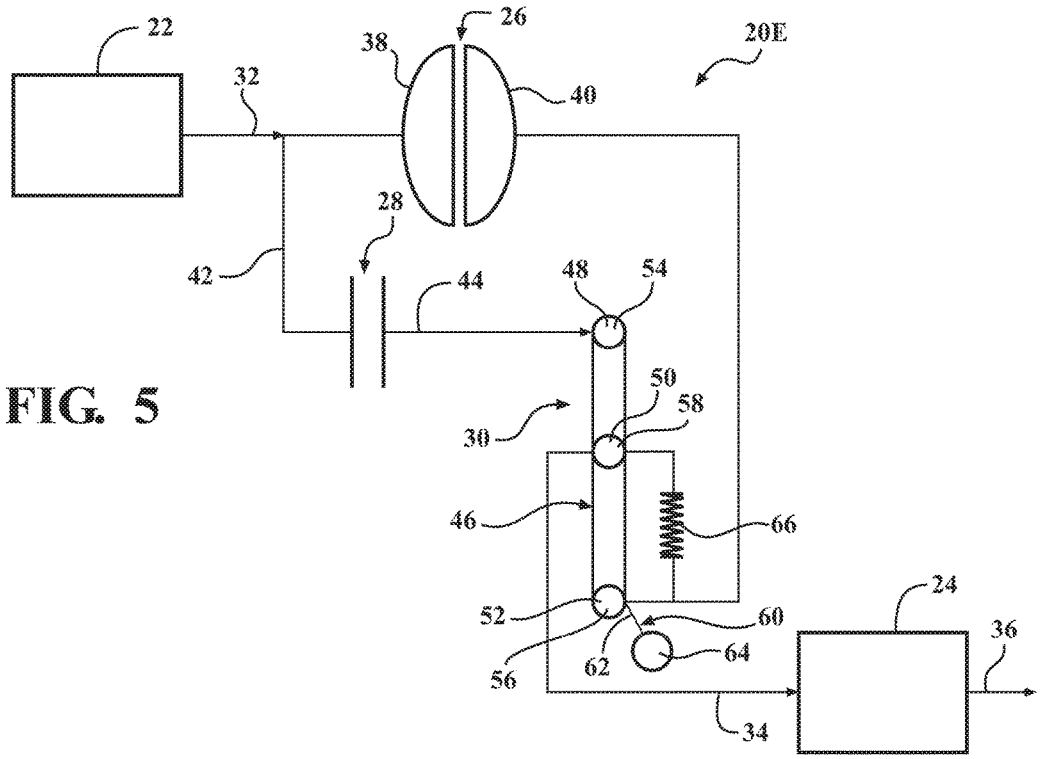
FIG. 5 is a schematic diagram of a fifth embodiment of the powertrain.

Referring to FIG. 5, a fifth embodiment of the powertrain is generally shown at 20E. The powertrain 20E shows the output 44 from the torque converter clutch 28 connected to the ring gear 54, the input 34 of the transmission 24 connected to the planet carrier 58, the turbine 40 and the centrifugal pendulum absorber 60 connected to the sun gear 56. Accordingly, in this embodiment, the ring gear 54 may be defined as the first one of the connection nodes, the planet carrier 58 may be defined as the second one of the connection nodes, and the sun gear 56 may be defined as the third one of the connection nodes. The spring 66 interconnects the sun gear 56 and the planet carrier 58. The sun gear 56 provides the mechanically advantaged node, whereas the planet carrier 58 and the ring gear 54 provide the non-mechanically advantaged nodes.

Figure 6:
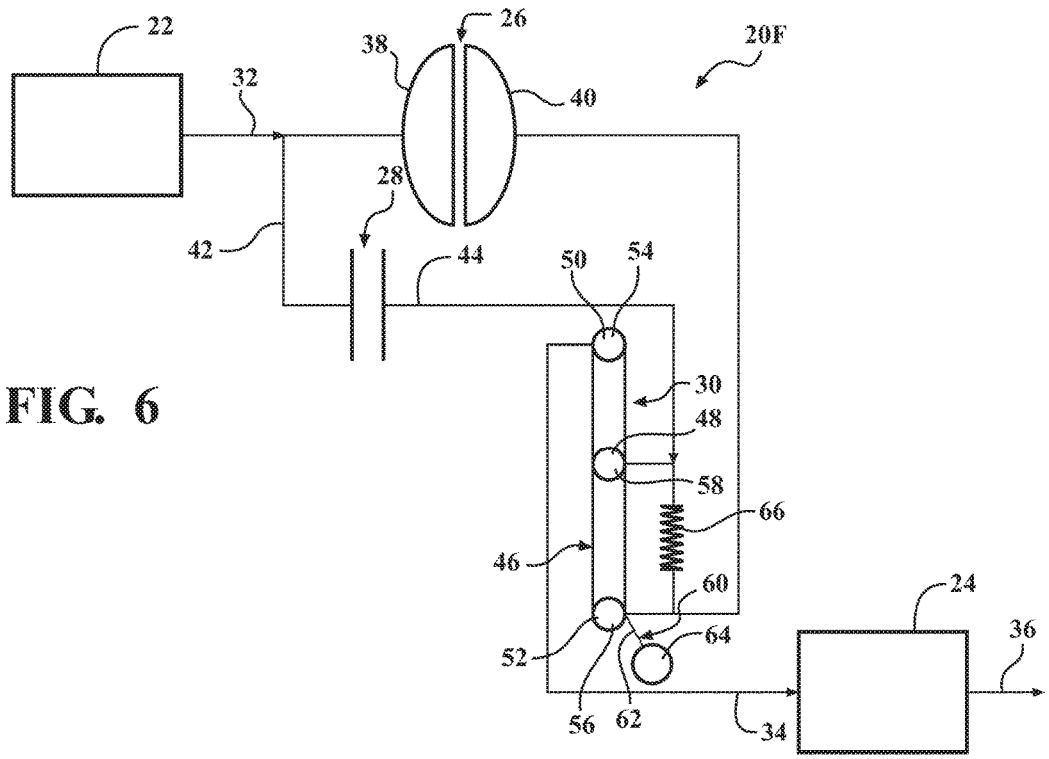
FIG. 6 is a schematic diagram of a sixth embodiment of the powertrain.

Referring to FIG. 6, a sixth embodiment of the powertrain is generally shown at 20F. The powertrain 20F shows the output 44 from the torque converter clutch 28 connected to the planet carrier 58, the input 34 of the transmission 24 connected to the ring gear 54, the turbine 40 and the centrifugal pendulum absorber 60 connected to the sun gear 56. Accordingly, in this embodiment, the planet carrier 58 may be defined as the first one of the connection nodes, the ring gear 54 may be defined as the second one of the connection nodes, and the sun gear 56 may be defined as the third one of the connection nodes. The spring 66 interconnects the sun gear 56 and the planet carrier 58. The sun gear 56 provides the mechanically advantaged node, whereas the planet carrier 58 and the ring gear 54 provide the non-mechanically advantaged nodes.

Figure 7:
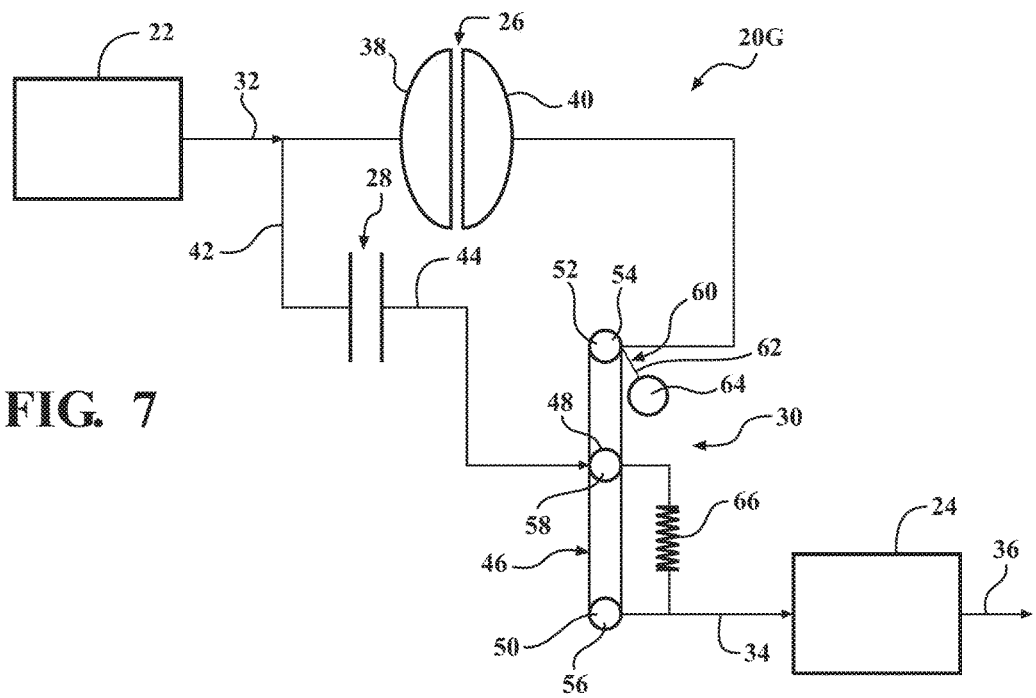
FIG. 7 is a schematic diagram of a seventh embodiment of the powertrain.

Referring to FIG. 7, a seventh embodiment of the powertrain is generally shown at 20G. The powertrain 20G shows the output 44 from the torque converter clutch 28 connected to the planet carrier 58, the input 34 of the transmission 24 connected to the sun gear 56, the turbine 40 and the centrifugal pendulum absorber 60 connected to the ring gear 54. Accordingly, in this embodiment, the planet carrier 58 may be defined as the first one of the connection nodes, the sun gear 56 may be defined as the second one of the connection nodes, and the ring gear 54 may be defined as the third one of the connection nodes. The spring 66 interconnects the sun gear 56 and the planet carrier 58. The ring gear 54 provides the mechanically advantaged node, whereas the planet carrier 58 and the sun gear 56 provide the non-mechanically advantaged nodes.

Figure 8:
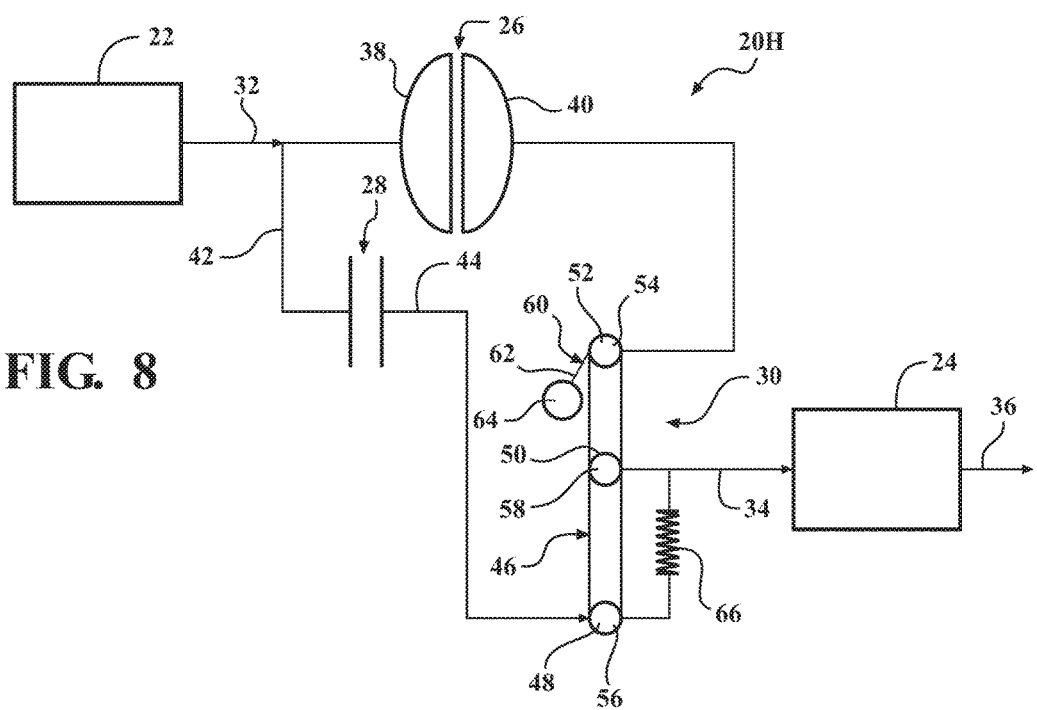
FIG. 8 is a schematic diagram of an eighth embodiment of the powertrain.

Referring to FIG. 8, an eighth embodiment of the powertrain is generally shown at 20H. The powertrain 20H shows the output 44 from the torque converter clutch 28 connected to the sun gear 56, the input 34 of the transmission 24 connected to the planet carrier 58, the turbine 40 and the centrifugal pendulum absorber 60 connected to the ring gear 54. Accordingly, in this embodiment, the sun gear 56 may be defined as the first one of the connection nodes, the planet carrier 58 may be defined as the second one of the connection nodes, and the ring gear 54 may be defined as the third one of the connection nodes. The spring 66 interconnects the sun gear 56 and the planet carrier 58. The ring gear 54 provides the mechanically advantaged node, whereas the planet carrier 58 and the sun gear 56 provide the non-mechanically advantaged nodes.

Figure 9:
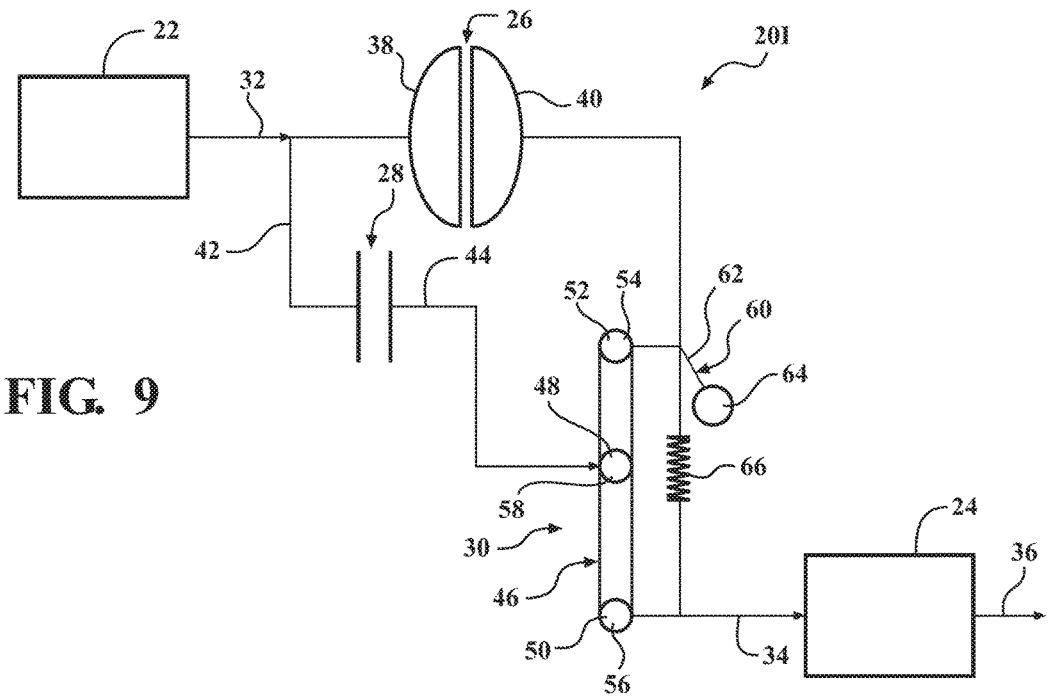
FIG. 9 is a schematic diagram of a ninth embodiment of the powertrain.

Referring to FIG. 9, a ninth embodiment of the powertrain is generally shown at 20I. The powertrain 20I shows the output 44 from the torque converter clutch 28 connected to the planet carrier 58, the input 34 of the transmission 24 connected to the sun gear 56, the turbine 40 and the centrifugal pendulum absorber 60 connected to the ring gear 54. Accordingly, in this embodiment, the planet carrier 58 may be defined as the first one of the connection nodes, the sun gear 56 may be defined as the second one of the connection nodes, and the ring gear 54 may be defined as the third one of the connection nodes. The spring 66 interconnects the sun gear 56 and the ring gear 54. The ring gear 54 provides the mechanically advantaged node, whereas the planet carrier 58 and the sun gear 56 provide the non-mechanically advantaged nodes.

Figure 10:
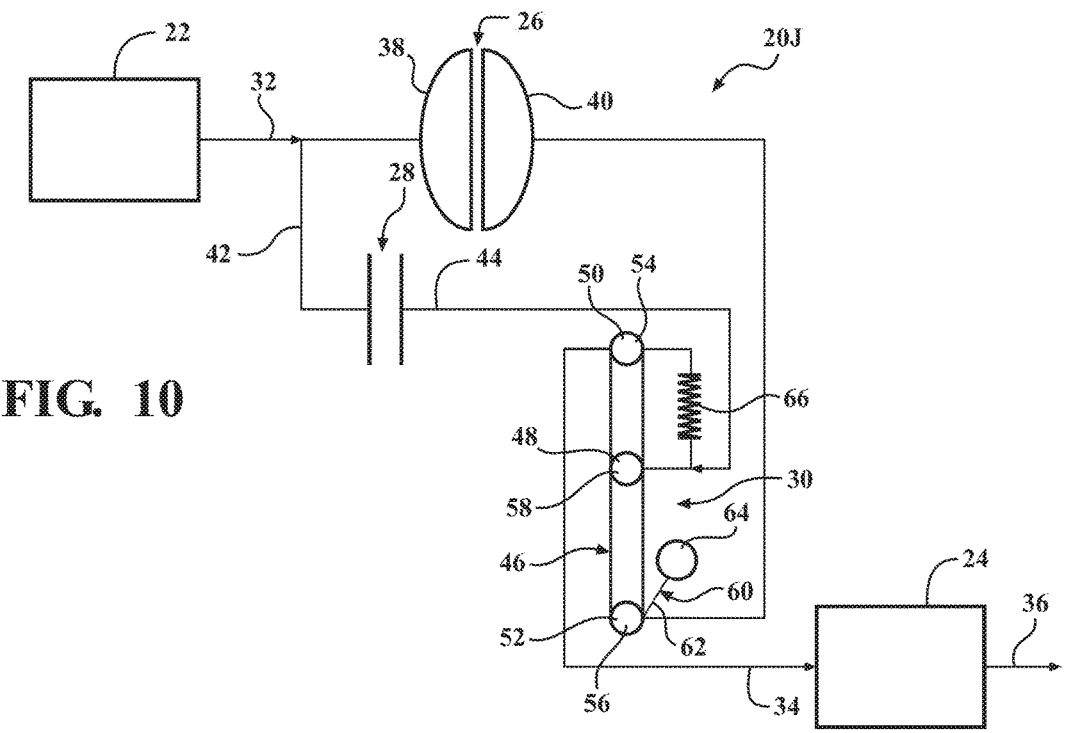
FIG. 10 is a schematic diagram of a tenth embodiment of the powertrain.

Referring to FIG. 10, a tenth embodiment of the powertrain is generally shown at 20J. The powertrain 20J shows the output 44 from the torque converter clutch 28 connected to the planet carrier 58, the input 34 of the transmission 24 connected to the ring gear 54, the turbine 40 and the centrifugal pendulum absorber 60 connected to the sun gear 56. Accordingly, in this embodiment, the planet carrier 58 may be defined as the first one of the connection nodes, the ring gear 54 may be defined as the second one of the connection nodes, and the sun gear 56 may be defined as the third one of the connection nodes. The spring 66 interconnects the ring gear 54 and the planet carrier 58. The sun gear 56 provides the mechanically advantaged node, whereas the planet carrier 58 and the ring gear 54 provide the non-mechanically advantaged nodes.

Figure 11:
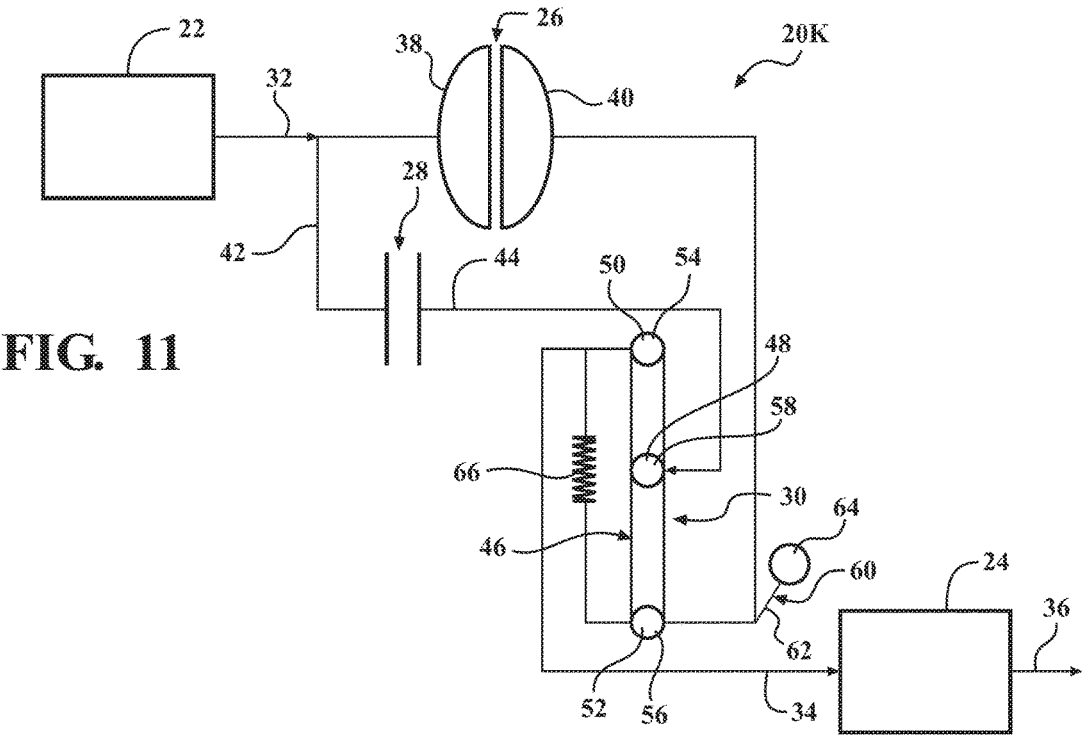
FIG. 11 is a schematic diagram of an eleventh embodiment of the powertrain.

Referring to FIG. 11, an eleventh embodiment of the powertrain is generally shown at 20K. The powertrain 20K shows the output 44 from the torque converter clutch 28 connected to the planet carrier 58, the input 34 of the transmission 24 connected to the ring gear 54, the turbine 40 and the centrifugal pendulum absorber 60 connected to the sun gear 56. Accordingly, in this embodiment, the planet carrier 58 may be defined as the first one of the connection nodes, the ring gear 54 may be defined as the second one of the connection nodes, and the sun gear 56 may be defined as the third one of the connection nodes. The spring 66 interconnects the ring gear 54 and the sun gear 56. The sun gear 56 provides the mechanically advantaged node, whereas the planet carrier 58 and the ring gear 54 provide the non-mechanically advantaged nodes.

Figure 12:
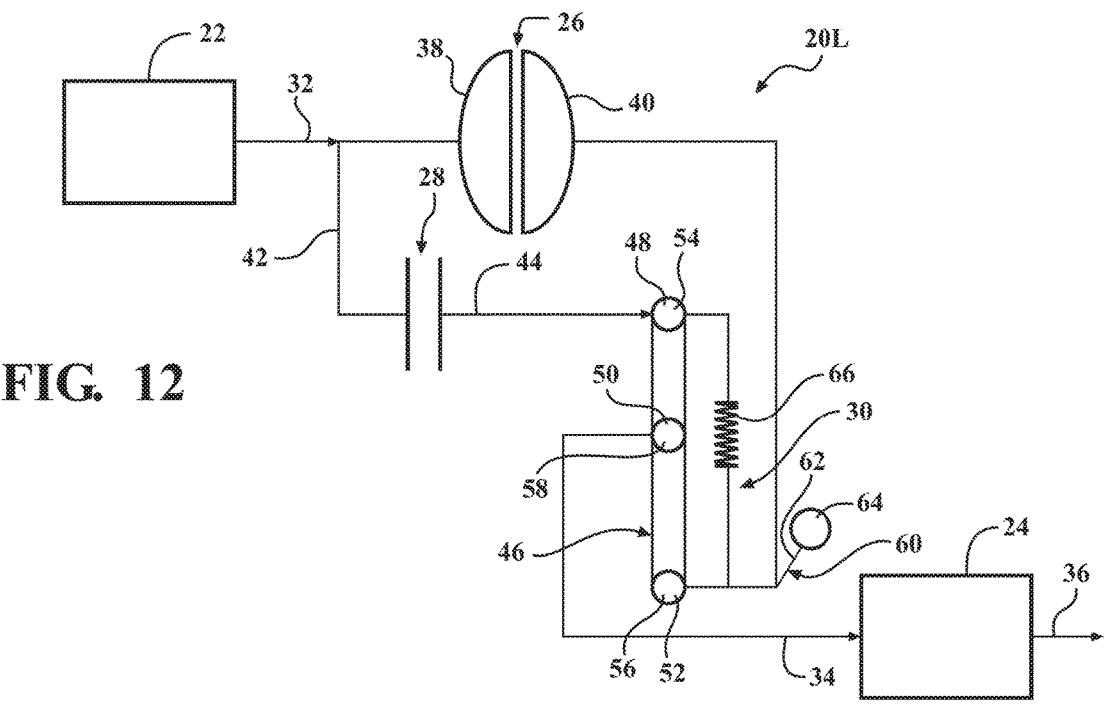
FIG. 12 is a schematic diagram of a twelfth embodiment of the powertrain.

Referring to FIG. 12, an twelfth embodiment of the powertrain is generally shown at 20L. The powertrain 20L shows the output 44 from the torque converter clutch 28 connected to the ring gear 54, the input 34 of the transmission 24 connected to the planet carrier 58, the turbine 40 and the centrifugal pendulum absorber 60 connected to the sun gear 56. Accordingly, in this embodiment, the ring gear 54 may be defined as the first one of the connection nodes, the planet carrier 58 may be defined as the second one of the connection nodes, and the sun gear 56 may be defined as the third one of the connection nodes. The spring 66 interconnects the ring gear 54 and the sun gear 56. The sun gear 56 provides the mechanically advantaged node, whereas the planet carrier 58 and the ring gear 54 provide the non-mechanically advantaged nodes.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A powertrain comprising:
   an engine having a crankshaft;
   a transmission having an input;
   a vibration absorption assembly having a mechanical connection system providing a first connection node, a second connection node, and a third connection node;
   wherein the mechanical connection system includes a planetary gear set having a ring gear, a sun gear, and a planet carrier supporting a planet gear, with each of the ring gear, the sun gear, and the planet carrier defining a respective one of the first connection node, the second connection node, and the third connection node;
   wherein one of the first connection node, the second connection node and the third connection node is a mechanically advantaged node providing a force amplification over at least one other of the first connection node, the second connection node and the third connection node;
   wherein the crankshaft is connected to a first one of the first connection node, the second connection node, and the third connection node;
   wherein the input of the transmission is connected to a second one of the first connection node, the second connection node, and the third connection node; and
   a centrifugal pendulum absorber connected to the mechanically advantaged node of the first connection node, the second connection node, and the third connection node.

2. The powertrain set forth in claim 1, further comprising a torque converter having a pump connected to the crankshaft for continuous rotation with the crankshaft, and a turbine connected to the mechanically advantaged node.

3. The powertrain set forth in claim 1, further comprising a torque converter having a pump connected to the crankshaft for continuous rotation with the crankshaft, and a turbine connected to the one of the first connection node, the second connection node, and the third connection node to which the centrifugal pendulum absorber is connected.

4. The powertrain set forth in claim 1, wherein the first connection node, the second connection node, and the third connection node are each different nodes of the mechanical connection system, such that the centrifugal pendulum absorber is not connected to the first one of the first connection node, the second connection node, and the third connection node to which the crankshaft is connected, or the second one of the first connection node, the second connection node and the third connection node to which the input of the transmission is connected.

5. The powertrain set forth in claim 1, further comprising a spring interconnecting two of the first connection node, the second connection node, and the third connection node.

6. The powertrain set forth in claim 1, further comprising a torque converter clutch interconnecting the crankshaft and the first one of the connection nodes, wherein the torque converter clutch is selectively controlled between an engaged state connecting the crankshaft and the mechanical connection system in direct torque communication, and a disengaged state disconnecting direct torque communication between the crankshaft and the mechanical connection system.

7. A powertrain comprising:
an engine having a crankshaft;
a transmission having an input;
a torque converter clutch having an input connected to the crankshaft and an output;
a vibration absorption assembly having a planetary gear set providing a first connection node, a second connection node, and a third connection node, wherein the planetary gear set includes a ring gear, a sun gear, and a planet carrier supporting at least one planet gear, with each of the ring gear, the sun gear, and the planet carrier defining a respective one of the first connection node, the second connection node, and the third connection node;
wherein one of the first connection node, the second connection node and the third connection node is a mechanically advantaged node providing a force amplification over at least one other of the first connection node, the second connection node and the third connection node;
wherein the output of the torque converter clutch is connected to a first one of the first connection node, the second connection node, and the third connection node;
wherein the input of the transmission is connected to a second one of the first connection node, the second connection node, and the third connection node;
a centrifugal pendulum absorber connected to the mechanically advantaged node of the first connection node, the second connection node, and the third connection node;
a torque converter having a pump connected to the crankshaft for continuous rotation with the crankshaft, and a turbine connected to the one of the first connection node, the second connection node, and the third connection node to which the centrifugal pendulum absorber is connected; and
a spring interconnecting two of the first connection node, the second connection node, and the third connection node.

8. The powertrain set forth in claim 7, wherein the first connection node, the second connection node, and the third connection node are each different nodes of the mechanical connection system, such that the centrifugal pendulum absorber is not connected to the first one of the first connection node, the second connection node, and the third connection node to which the output of the torque converter clutch is connected, or the second one of the first connection node, the second connection node and the third connection node to which the input of the transmission is connected.

9. The powertrain set forth in claim 7, wherein the torque converter clutch is selectively controlled between an engaged state connecting the crankshaft and the mechanical connection system in direct torque communication, and a disengaged state disconnecting direct torque communication between the crankshaft and the mechanical connection system.

10. A powertrain comprising:
an engine having a crankshaft;
a transmission having an input;
a vibration absorption assembly having a planetary gear set providing a first connection node, a second connection node, and a third connection node, wherein the planetary gear set includes a ring gear, a sun gear, and a planet carrier supporting at least one planet gear, with each of the ring gear, the sun gear, and the planet carrier defining a respective one of the first connection node, the second connection node, and the third connection node;
wherein the crankshaft is connected to a first one of the first connection node, the second connection node, and the third connection node;
wherein the input of the transmission is connected to a second one of the first connection node, the second connection node, and the third connection node;
a centrifugal pendulum absorber connected to one of the first connection node, the second connection node, and the third connection node;
wherein one of the first connection node, the second connection node and the third connection node is a mechanically advantaged node providing a force amplification over at least one other of the first connection node, the second connection node and the third connection node; and
wherein the centrifugal pendulum absorber is connected to the mechanically advantaged node.

11. The powertrain set forth in claim 10, further comprising a torque converter having a pump connected to the crankshaft for continuous rotation with the crankshaft, and a turbine connected to one of the first connection node, the second connection node, and the third connection node to which the centrifugal pendulum absorber is connected.

12. The powertrain set forth in claim 10, further comprising a spring interconnecting two of the first connection node, the second connection node, and the third connection node.

13. The powertrain set forth in claim 10, wherein the first connection node, the second connection node, and the third connection node are each different nodes of the mechanical connection system, such that the centrifugal pendulum absorber is not connected to the first one of the first connection node, the second connection node, and the third connection node to which the crankshaft is connected, or the second one of the first connection node, the second connection node and the third connection node to which the input of the transmission is connected.

* * * * *